UNITED STATES PATENT OFFICE.

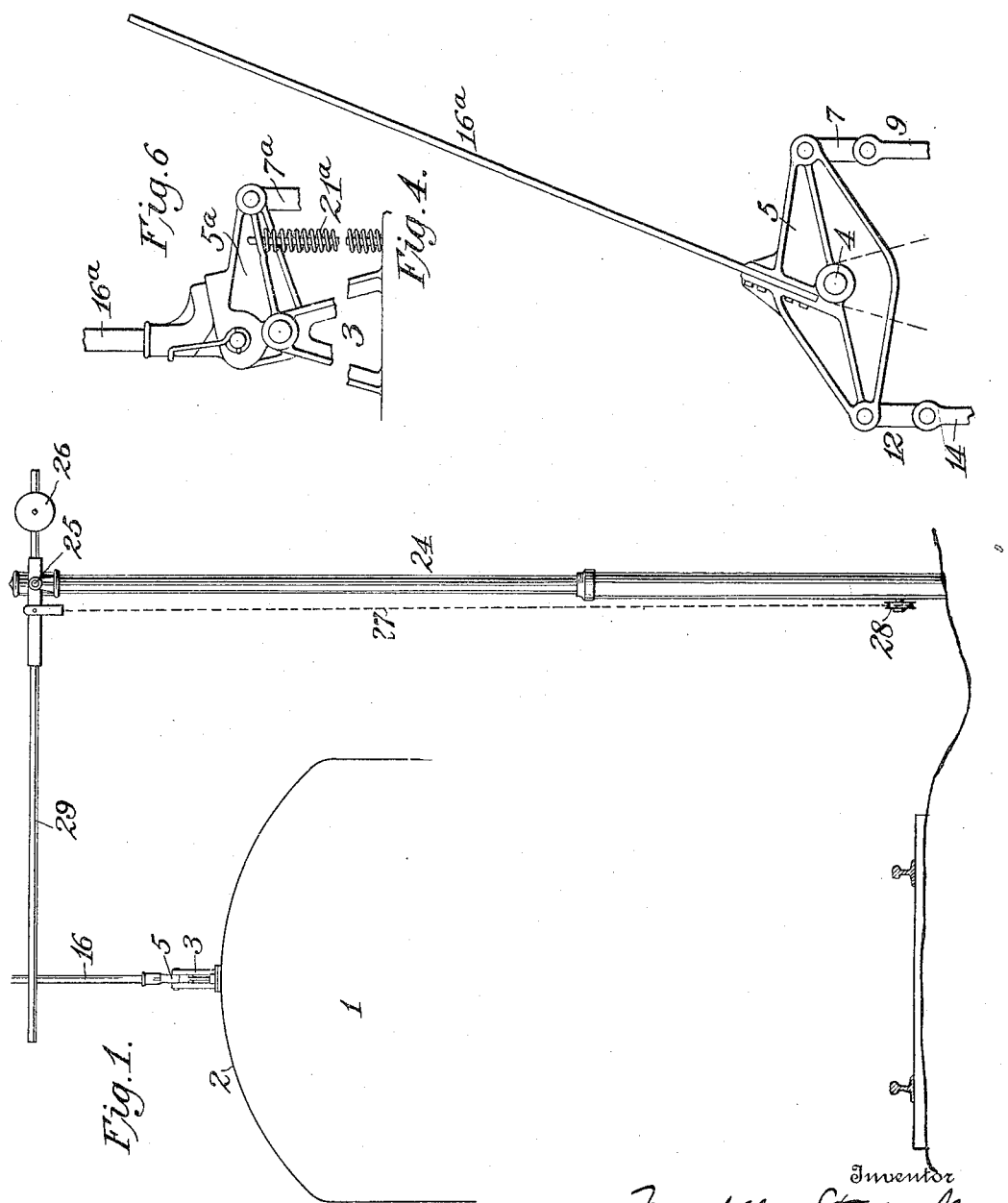

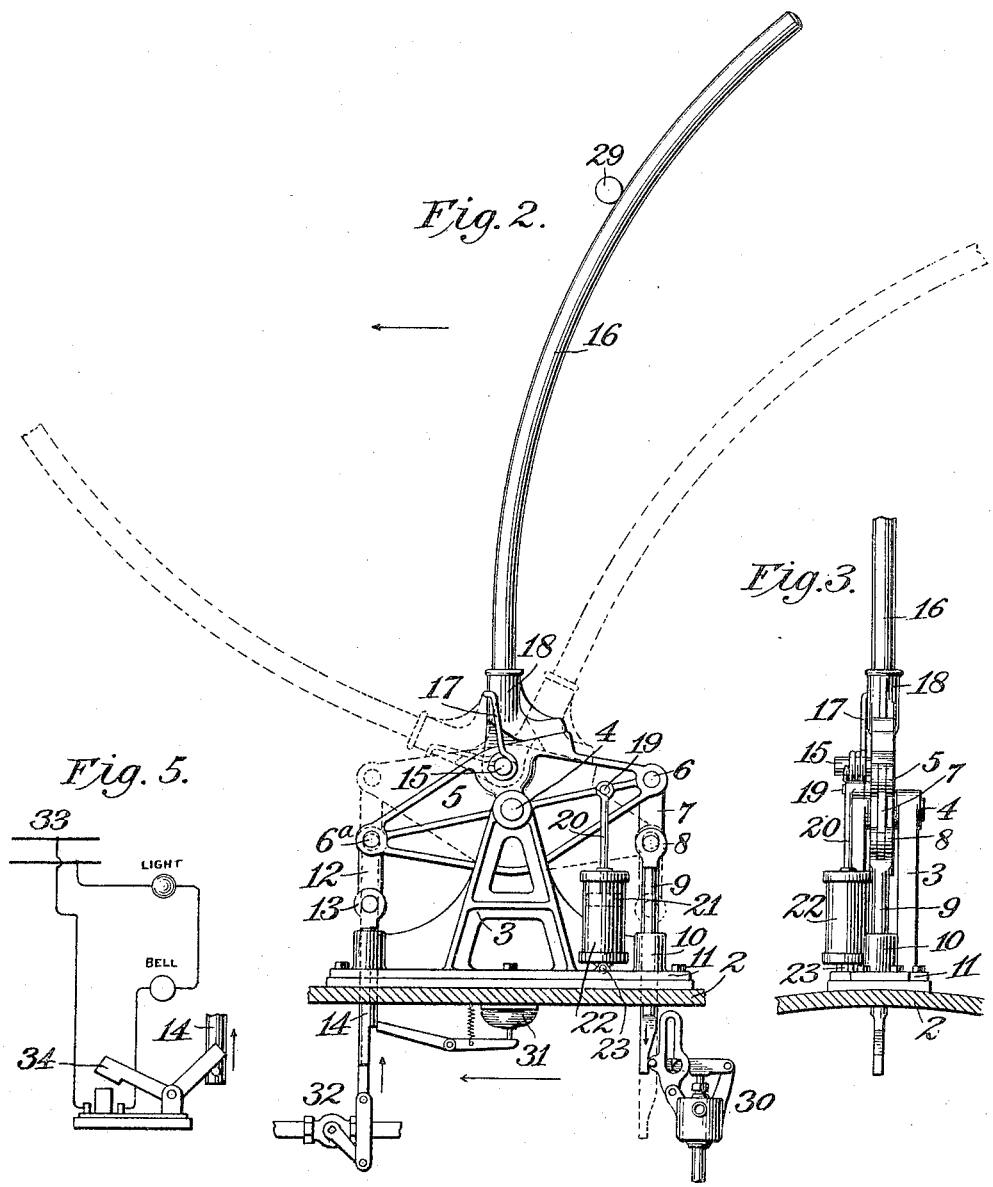

FRANKLIN STEELE, JR., OF WASHINGTON, DISTRICT OF COLUMBIA.

AUTOMATIC TRAIN CONTROL AND ALARM.

1,115,254.   Specification of Letters Patent.   Patented Oct. 27, 1914.

Application filed December 31, 1913.   Serial No. 809,781.

*To all whom it may concern:*

Be it known that I, FRANKLIN STEELE, Jr., a citizen of the United States, residing at Washington, in the District of Columbia, have invented new and useful Improvements in Automatic Train Controls and Alarms, of which the following is a specification.

This invention relates to safety devices for railroads, and is designed to call the attention of the engineer of a moving train to the fact that the ordinary signal, as a semaphore arm, set to danger at the side of the track, has been passed, and at the same time to automatically shut off steam, set the brakes, sound an audible signal so situated within the cab, or otherwise, as to be within the hearing of the engineer, and to display a signal visible to him. My invention is applicable for use without change in the equipment of the road as to signal posts, semaphore arms, or the like employed in approved systems of block signaling.

In carrying out my invention, I attach an operative device to the top of a locomotive cab, or to the roof of a passenger, mail, express or box car, caboose or similar species of rolling stock. As a part of this device is used a rod or an arm extending upward from the roof of the cab or car, and calculated to come in contact with a fixed and rigid pole or bar projecting from a post, such impact causing the arm to be inclined backward and thus to move a rocker connected with a valve or valves, or other devices, controlling the steam, the air brake and the alarm devices, or either of them. Such alarm devices may be a bell or gong and a light, and these may be mechanically or electrically operated.

Each post to which a rigid pole or bar is secured should be placed, after the manner of signal posts, in such proximity to the roadbed as is consistent with safety, the said bars being each rigged as is a semaphore arm, and controlled by a lever to which is fastened a wire or cable. The arm upstanding from the roof of the cab or car should encounter the rigid pole or bar at a point twelve inches, more or less, from the extreme end of the former, the impact causing a depression or lowering of the arm to such extent that it may become locked and held down until pressure is removed or the arm is otherwise released. The rocker may be moved through the medium of the upstanding arm either with or without the interposition of concussion-reducing springs or similar instrumentalities, or the arm may in itself have a degree of flexibility.

The altitude of the arm mounted upon the cab or car should be such that it shall be in the path of the rigid bar when the latter is lowered into position for engagement, that is to say, when danger is indicated by the semaphore arm. The height at which the rigid bar is placed is uniform, as also is or may be the height to which the arm projecting from the cab or car reaches. The extreme height of the arm above the top of the cab or car might be three feet more or less, and the greatest altitude of the rigid pole or bar above the roadbed should be such as to enable it to clear and escape contact with any upward projection from the locomotive, or any part of the train drawn thereby.

In the accompanying drawings, Figure 1 is an end view showing a portion of a cab or car and a post at the side of the track, the car and post carrying elements entering into my invention. Fig. 2 is a side view on enlarged scale more fully indicating features of the invention. Fig. 3 is an end view of part of Fig. 2. Fig. 4 is a side view showing a modification of a feature of my invention. Fig. 5 shows diagrammatically electrical connections optionally used in giving visual and audible signals. Fig. 6 shows a modification hereinafter described.

Let 1 represent a part of the upper portion of an engine cab or a car, of which 2 is the roof. As shown more particularly in Fig. 2, to this roof 2 is attached a base plate 11 having a central standard 3, to which is pivoted, by trunnions 4, a two-armed rocker 5. This rocker is provided at each end with a pivot, these being marked 6, $6^a$.

At 6 is journaled one end of a link 7, the other end of which is pivoted to the eye 8 of the plunger 9. This plunger passes through, and is guided by, the cylindrical boss 10 formed upon the base plate 11. Suspended from the pivot $6^a$ of the rocker 5 is a link 12, which in turn is swiveled to the eye 13 of the plunger 14. Pivoted upon the rocker 5 by a pin 15 above the axis or trunnions 4, is a socket 18 having a rear part or foot which normally rests upon a seat forming a part of the rocker, as shown in Fig. 2. The socket 18 carries an upstanding arm 16 which has movement, to such positions as are indicated by dotted lines, upon its pin 15. A spring 17 is coiled at one end around and secured to a projection of the pin 15, and its other end is fastened to the socket 18, which as stated, is pivotally connected by the pin 15 with the rocker 5.

Between the axis 4 of the rocker 5 and the pivot 6 is a pin 19 to which is linked a plunger rod 20 having a piston 21 fitting in a cylinder 22. This cylinder is adapted to tilt upon the pin 23, which rests in lugs formed upon the lower head of the cylinder 22 and the base plate 11, respectively. The cylinder 22, with its piston 21, serves as a dash pot to take up concussion to which the rocker 5 is subjected, as hereinafter explained.

In the forward path of the arm 16 stands a rigid pole or bar 29, Fig. 1, carried by a post 24, which may or may not serve as that used for the ordinary semaphore arm used in railroad signaling. This bar 29 is movable upon the pin 25, and provided at its inner end with a weight 26, and may be adjusted in its horizontal position, by means of devices usual in the moving of semaphore arms, through the medium of the chain 27 which passes over the pulley 28. It will be understood that when the semaphore arm is set at danger the bar 29 will also be brought to horizontal position.

Other parts entering into my invention will be referred to in the description of the operation of the device as shown more particularly in Figs. 1, 2 and 3, as follows: Let it be supposed that an engineer, through negligence or inadvertence, has passed a danger signal. The same mechanism, and the same action which has set the semaphore arm to danger will by preference have set the arm 29 to horizontal position. The train moving in the direction of the arrow at the upper part of Fig. 2, on the arm 16 striking the bar 29 the former will tilt the rocker 5, and sliding under said bar will assume the position shown in dotted lines at the right of Fig. 2. After the arm 16 passes the bar 29 the spring 17 will restore it to its normal upstanding position. The action of the dash pot 21 and its adjuncts is so calculated as to allow such impact of the arm 16 with the bar 29 as will give the necessary movement to the rocker 5, without offering such resistance to the shock as might result in the distortion or breakage of said arm. The depression of the plunger 9 at the right of Fig. 2, will through the medium of the valve mechanism, indicated generally by 30, and which is in communication with an air or vacuum brake system, effect the setting of brakes, while the rising of the plunger 14 will produce the sounding of the gong 31. The plunger 9, or that 14, may have appropriate mechanical connection with a steam valve whereby to shut off steam from the engine. Such a valve and suitable connections are shown by 32.

In Fig. 4 16$^a$ shows an arm sufficiently flexible to perform the work above described with reference to the arm 16 without the use of such concussion-reducing appliances or means for restoring the arm to its normal upstanding position as are shown in Figs. 2 and 3. The arm 16$^a$ will be of some appropriate metal giving it the requisite strength and resiliency.

In Fig. 5 are shown electric feeding wires 33 connected up with a circuit in which are included a light and a bell. The circuit is seen open, but the switch arm 34 is moved so as to close the circuit by means of the plunger 14 with which this electric signaling device may optionally be combined.

In Fig. 2 the dotted lines at the left show the position to which the arm 16 is brought or placed when the engine is backing so as to clear the bar 29.

While in my preferred construction, I employ a rocker having two arms, and therefore in its vibration capable of performing the various operations hereinbefore described, I may use, as shown in Fig. 6, a rocker 5$^a$, having but one arm, with a link 7$^a$ which may be connected up with the valve of the brake system, and also with alarm and other means. This arm is provided with a resistant 21$^a$, as in the preferred arrangement described. No change is required in this modification in the construction or placing of the upstanding arm, here shown by 16$^a$.

In the claims the word "car" is to be understood as covering any suitable part of a locomotive, as its cab, or any species of railroad rolling stock.

I claim:—

1. In an automatic train control and alarm, the combination of a standard mounted on a car, a rocker journaled in said standard, an upstanding and self-righting arm carried by said rocker, a rigid pole or bar mounted in the path of said upstanding arm, shock-reducing means associated with said rocker, and alarm means connected with said rocker and adapted to be put in action when movement given to the upstanding arm by contact with said rigid pole or bar is communicated by said arm to said rocker, substantially as set forth.

2. In an automatic train control and alarm, the combination of a standard mounted on a car, a rocker journaled in said standard, an upstanding and self-righting arm carried by said rocker, a rigid pole or bar mounted in the path of said upstanding arm, shock-reducing means associated with said rocker, and control and alarm means connected with said rocker and adapted to be put in action when movement given to the upstanding arm by contact with said rigid pole or bar is communicated by said arm to said rocker, substantially as set forth.

In testimony whereof I affix my signature in presence of two witnesses.

FRANKLIN STEELE, Jr.

Witnesses:
CHARLES LOWELL HOWARD,
C. B. BULL.

Copies of this patent may be obtained for five cents each, by addressing the "Commissioner of Patents, Washington, D. C."